(12) United States Patent
Hannigan

(10) Patent No.: US 7,537,259 B2
(45) Date of Patent: May 26, 2009

(54) DRIP GUARD FOR MACHINERY

(76) Inventor: Sean Hannigan, 2, 51331 RR 224, Sherwood Park, Alberta (CA) T8C 1H3

( * ) Notice: Subject to any disclaimer, the term of this patent is extended or adjusted under 35 U.S.C. 154(b) by 0 days.

(21) Appl. No.: 11/777,519

(22) Filed: Jul. 13, 2007

(65) Prior Publication Data

US 2008/0012377 A1 Jan. 17, 2008

Related U.S. Application Data

(60) Provisional application No. 60/830,752, filed on Jul. 13, 2006.

(51) Int. Cl.
*B62D 27/00* (2006.01)
(52) U.S. Cl. .......................................................... 296/38
(58) Field of Classification Search .................... 296/38
See application file for complete search history.

(56) References Cited

U.S. PATENT DOCUMENTS

| | | | | |
|---|---|---|---|---|
| 2,171,813 | A * | 9/1939 | Stockstrom | 180/69.1 |
| 2,732,024 | A * | 1/1956 | Schonwald | 180/69.1 |
| 2,783,848 | A * | 3/1957 | Beskid | 180/69.1 |
| 3,284,273 | A * | 11/1966 | Prentice | 428/76 |
| 3,316,995 | A * | 5/1967 | Fay | 180/69.1 |
| 3,329,231 | A * | 7/1967 | Morio | 180/69.1 |
| 3,333,652 | A * | 8/1967 | Tribuzi | 180/69.1 |
| 3,454,124 | A * | 7/1969 | Niedek | 180/69.1 |
| 3,918,542 | A * | 11/1975 | Murillo | 180/69.1 |
| 4,909,355 | A * | 3/1990 | Ramos | 184/106 |
| 4,936,418 | A * | 6/1990 | Clausen | 180/69.1 |
| 5,090,588 | A * | 2/1992 | Van Romer et al. | 220/573 |
| 5,099,872 | A * | 3/1992 | Tarvin et al. | 296/38 |
| 5,417,310 | A * | 5/1995 | Halseth | 184/106 |
| 5,478,625 | A * | 12/1995 | Wright | 296/38 |
| 5,482,093 | A * | 1/1996 | Tremonti et al. | 141/98 |
| 5,501,290 | A * | 3/1996 | Volz et al. | 296/38 |
| 5,526,900 | A * | 6/1996 | Mason | 296/38 |
| 5,711,402 | A * | 1/1998 | Sumpter, Sr. | 296/38 |
| 5,775,869 | A * | 7/1998 | Bishop | 414/608 |
| 5,819,819 | A * | 10/1998 | Stanley | 141/98 |
| 5,967,200 | A * | 10/1999 | Hall | 141/86 |
| 6,170,586 | B1 * | 1/2001 | Stroman | 180/69.1 |
| 6,178,990 | B1 * | 1/2001 | Bellenger et al. | 137/312 |
| 6,189,721 | B1 * | 2/2001 | Bishop | 220/573 |
| 6,439,492 | B1 | 8/2002 | Leiggi | |
| 6,945,362 | B1 * | 9/2005 | Sumpter, Sr. | 184/106 |
| 7,047,930 | B2 * | 5/2006 | Sitzberger | 123/196 R |
| 2008/0012377 | A1 * | 1/2008 | Hannigan | 296/38 |

* cited by examiner

*Primary Examiner*—Kiran B. Patel
(74) *Attorney, Agent, or Firm*—Davis & Bujold, P.L.L.C.

(57) ABSTRACT

There is provided a vehicle and a drip guard for containing any material spilling from the vehicle. The drip guard has a sheet of liquid impervious material, and a device for extending and retracting the sheet of liquid impervious material along the undercarriage of the vehicle. The sheet of liquid impervious material is attached to the vehicle and has drainage ports. In the retracted position the sheet of liquid impervious material is retracted toward a first end of the undercarriage. In the extended position, the sheet of liquid impervious material is extended from the first end of the undercarriage toward a second end of the undercarriage. In the extended position, the sheet underlies a major portion of the undercarriage. The sheet of liquid impervious material is attached to cables that guide and support the sheet of liquid impervious material between the extended position and the retracted position. The combination presented in this document allows hazardous materials that spill from a vehicle to be collected and safely disposed of without contaminating the environment.

12 Claims, 6 Drawing Sheets

DRIP GUARD FOR MACHINERY

FIELD

The present application relates to a drip guard for machinery, specifically, a drip guard for a vehicle or a piece of equipment susceptible to dripping or leaking fluids.

BACKGROUND

U.S. Pat. No. 5,417,310 (Halseth) entitled "Vehicle Drip Guard" describes a drip guard that is attached to the bottom of a vehicle for collecting any leaking fluids.

SUMMARY

There is provided a vehicle, and a drip guard. The drip guard has multiple cables, a sheet of liquid impervious material, and a device for extending and retracting the sheet of liquid impervious material. The multiple cables are attached to the vehicle and extend along an undercarriage of the vehicle. The sheet of liquid impervious material is attached to the vehicle, and has drainage ports. There is a retracted position and an extended position for the sheet of liquid impervious material. In the retracted position the sheet of liquid impervious material is retracted toward a first end of the undercarriage. In the extended position, the sheet of liquid impervious material is extended from the first end of the undercarriage toward a second end of the undercarriage. In addition, in the extended position the sheet underlies a major portion of the undercarriage. The sheet of liquid impervious material is attached to the cables such that the sheet is movable along the cables. In this way the multiple cables guide the sheet of liquid impervious material between the extended position and the retracted position. In addition, the multiple cables support the sheet of liquid impervious material in the extended position and partially extended position.

BRIEF DESCRIPTION OF THE DRAWINGS

These and other features will become more apparent from the following description in which reference is made to the appended drawings, the drawings are for the purpose of illustration only and are not intended to be in anyway limiting, wherein.

DETAILED DESCRIPTION

Figure 1:
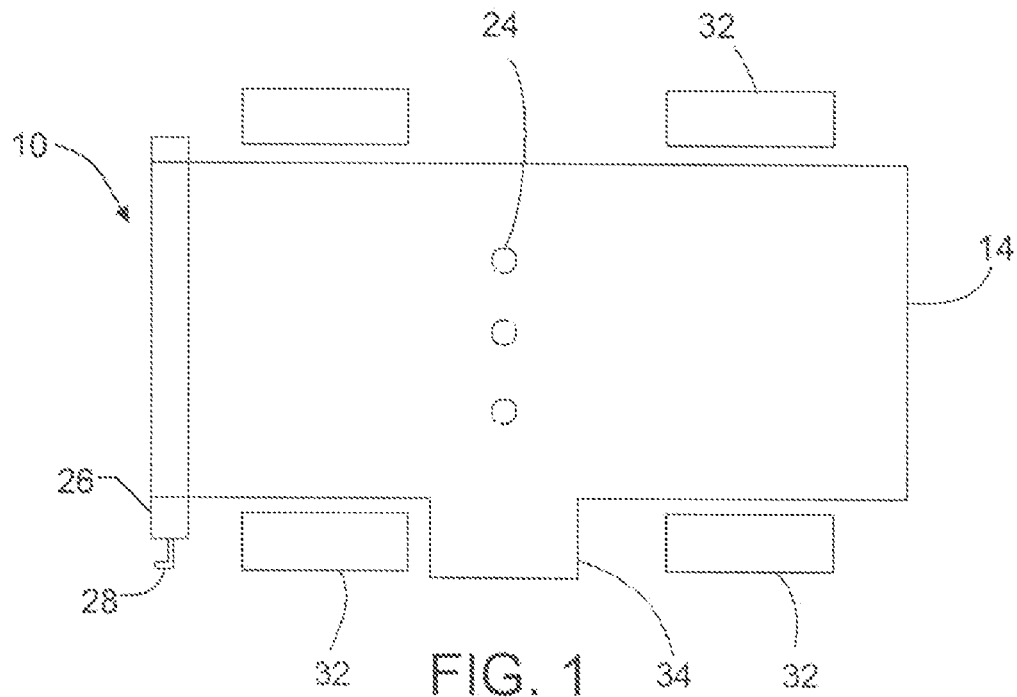
FIG. 1 is a bottom view of a drip guard fully extended along the undercarriage of a vehicle.

A drip guard generally identified by reference numeral 10, will now be described with reference to FIG. 1 through 16.

Figure 3:
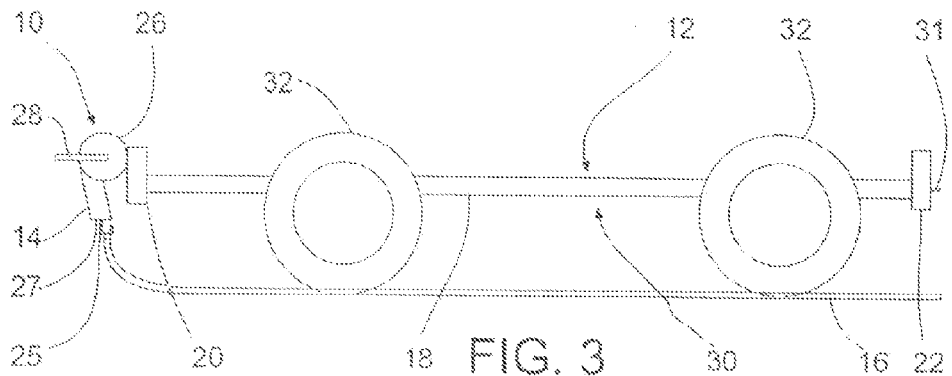
FIG. 3 is a side elevation view, partially in section, of the drip guard of FIG. 1 in the retracted position.
Figure 4:
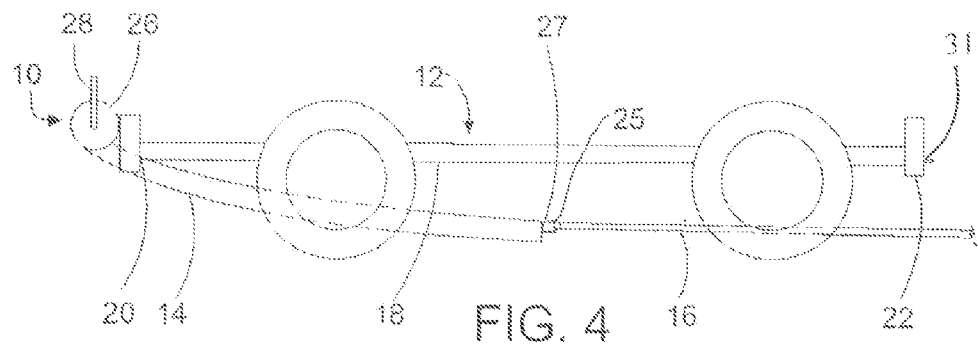
FIG. 4 is a side elevation view, partially in section, of the drip guard of FIG. 1 being extended along the undercarriage of a vehicle using a draw cable.
Figure 5:
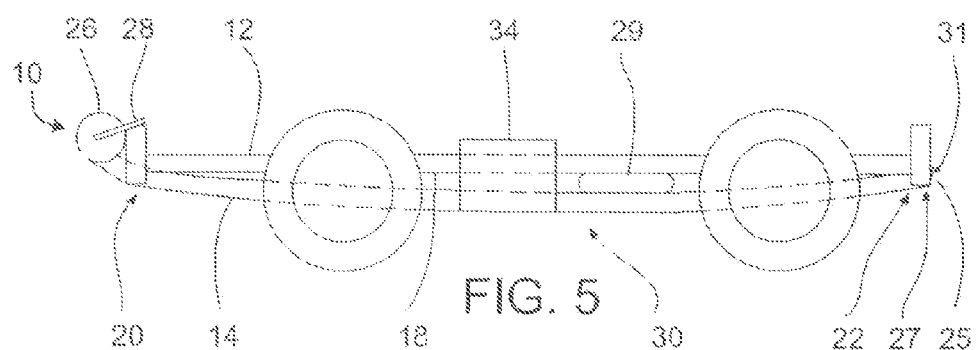
FIG. 5 is a side elevation view, partially in section, of the drip guard of FIG. 1 fully extended along the undercarriage of a vehicle.

Structure and Relationship of Parts:

Referring to FIG. 3, drip guard 10 and a vehicle 12 (i.e., a piece of machinery) are shown. Drip guard 10 consists of a liquid impervious sheet 14 and a draw cable 16. Vehicle 12 consists of an undercarriage 18. Vehicle 12 may be any type or piece of equipment that is susceptible to dripping or leaking fluids. Undercarriage 18 has a first end 20 and a second end 22. It should be understood that either of first or second end 20 and 22, respectively, could be situated at the front of vehicle 12. Sheet 14 may have a hook 25. Hook 25 is position at an extending end 27 of sheet 14. There may be more than one of hooks 25 provided at extending end 27 of sheet 14. Referring to FIG. 1, sheet 14 may have drainage ports 24. Referring to FIG. 3, draw cable 16 is provided for extending and retracting sheet 14, draw cable 16 being drawn by hand (not shown), winch 33 (shown in FIG. 8), or other types of mechanical systems (not shown). Sheet 14 is attached to a roller assembly 26. Roller assembly 26 is attached to vehicle 12. Roller assembly 26 may be attached to first end 20 of undercarriage 18 or to any other part of vehicle 12. Roller assembly 26 is provided with a crank 28. Crank 28 allows roller assembly 26 to roll or unroll sheet 14, as shown in FIGS. 3-5. Crank 28 may be operated using hands or other cranking tools. Alternatively, crank 28 may be operated mechanically, such as using an electric motor (not shown).

Figure 8:
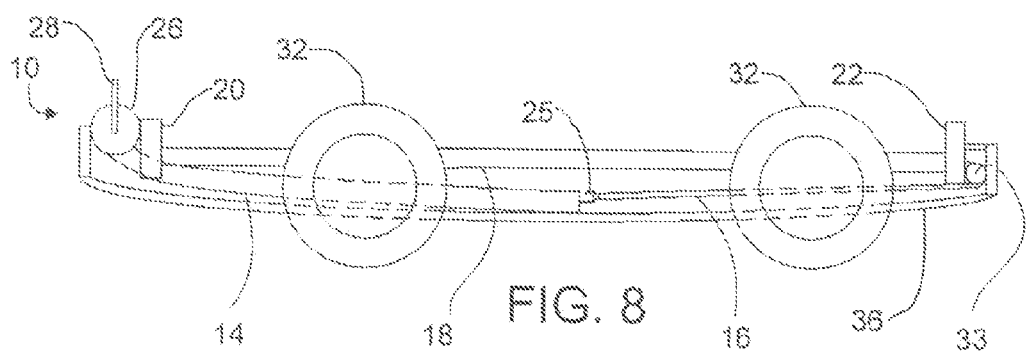
FIG. 8 is a side elevation view, partially in section, of the drip guard of FIG. 7 being extended using a winch.

Referring to FIG. 3, sheet 14 is shown in a retracted position. In the retracted position, sheet 14 is retracted toward first end 20 of undercarriage 18. In the retracted position, sheer 14 is rolled up around roller assembly 26. Draw cable 16 is shown attached to hook 25. Referring to FIG. 4, sheet 14 is shown in a partially extended position. Draw cable 16 is shown extending sheet 14 from first end 20 to second end 22 of undercarriage 18. Referring to FIG. 5, sheet 14 is shown in a fully tended position from first end 20 to second end 22. In the fully extended position, sheet 14 underlies a major portion 30 of undercarriage 18 in order to catch any materials that may leak or spill from vehicle 12. Sheet 14 is secured to second end 22 of undercarriage 18 in the fully extended position. An example of a method of securing sheet 14 to undercarriage 18 is shown by attaching hook 25 to a loop 31 attached to second end 22. Referring to FIG. 8, other methods of securing sheet 14 to undercarriage 18 may be used, such as using a winch 33. Draw cable 16 may be provided as being retractable/extendable by winch 33. Alternatively, winch 33 may be provided as an additional hand crank (not shown). Referring to FIG. 5, sheet 14, when fully extended and secured, may be pulled up tight against part of undercarriage 18 that extend substantially downwards. In the example shown in FIG. 5, sheet 14 is pulled up tight against a spare tire 29. This is advantageous, because it allows the sloping of sheet 14 to be controlled in such a manner that will direct any materials that are spilled onto sheet 14 towards desired regions of sheet 14, such as drainage ports 24 (shown in FIG. 1). By strategically placing items like spare tire 29 near drainage ports 24, the lowest points of sheet 14 will be oriented over drainage ports 24. This way, any material spilled onto sheet 14 may be collected through drainage ports 24 when it is desirable to do so.

Figure 2:
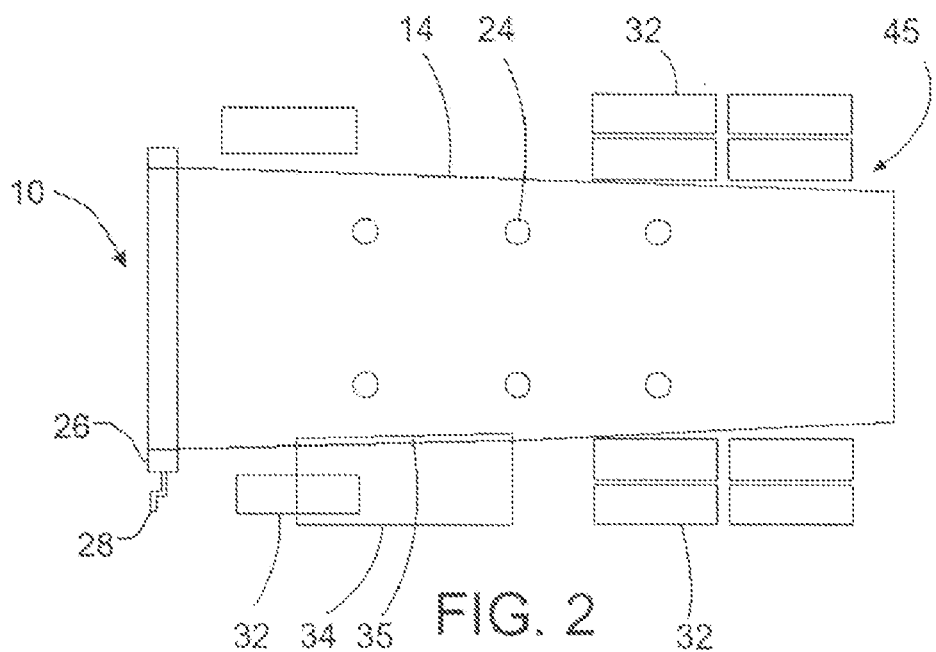
FIG. 2 is a bottom view of an embodiment of a drip guard fully extended along the undercarriage of a trailer.

Referring to FIG. 1, sheet 14 is designed to cover undercarriage 18 (shown in FIG. 3) without obstructing any of wheels 32. Sheet 14 may have extendable flaps 34 which extend beyond sheet 14. Flaps 34 may be designed so that they extend between wheels 32 and provide extra spill protection. Referring to FIG. 2, flaps 34 may also extend overtop or underneath any of wheels 32. Referring to FIG. 5, flaps 34 may also be designed to extend beyond undercarriage 18 to underlie external portions (not shown) of vehicle 12 and undercarriage 18. An example of an external portion may include an external fuel tank (not shown). Flaps 34 may be provided as part of sheet 14 (shown in FIG. 1), or as pieces of liquid impervious material separate from sheet 14 (shown in FIG. 2). Referring to FIG. 2, flaps 34 may be attached using strips of Velcro 35. In this case, flaps 34 should provide a seal that prevents any materials being collected on sheet 14 or flaps 34 from leaking onto the ground between flaps 34 and sheet 14. Alternatively, other methods of attaching flaps 34 may be used, such as clips, bolts and adhesive.

Figure 6:
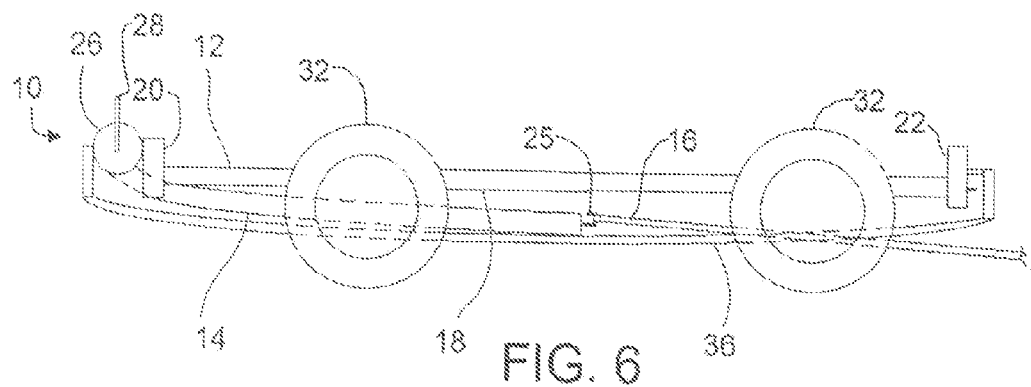
FIG. 6 is a side elevation view, partially in section, of the drip guard of FIG. 4 with guide cables running underneath the drip guard.
Figure 7:
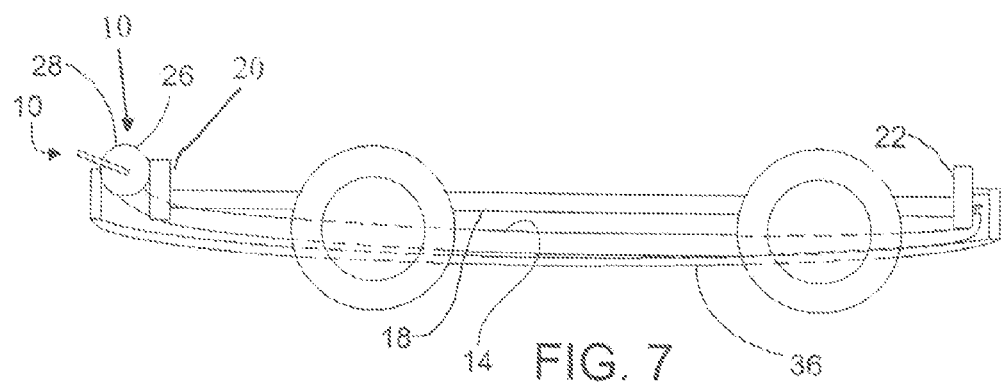
FIG. 7 is a side elevation view, partially in section, of the drip guard of FIG. 6 in the fully extended position.
Figure 9:
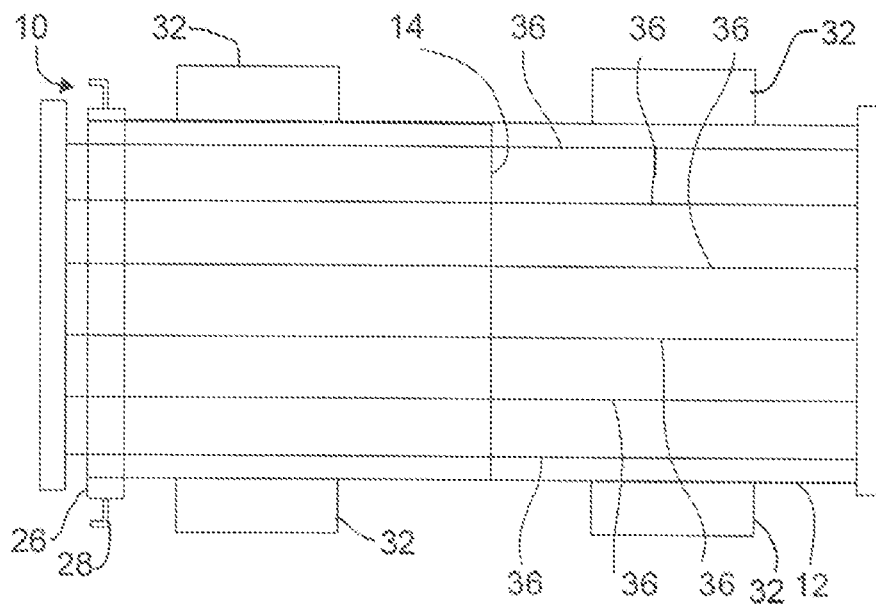
FIG. 9 is a bottom view of the drip guard of FIG. 6.

Referring to FIG. 9, multiple cables 36 may be attached to vehicle 12. In the example shown in FIG. 9, there are five of cables 36. Alternatively, there may be more than one of cables 36. Referring to FIG. 6, cables 36 extend along undercarriage 18 of vehicle 12. In the example shown in FIGS. 6 and 7, cables 36 are provided to support sheet 14 in the extended position.

Figure 10:
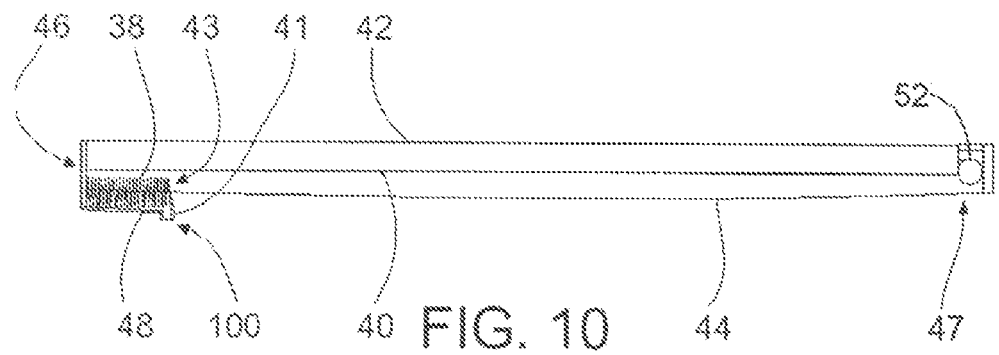
FIG. 10 is a side elevation view of a drip guard that is bunched in an accordion fashion in the retracted position.
Figure 11:
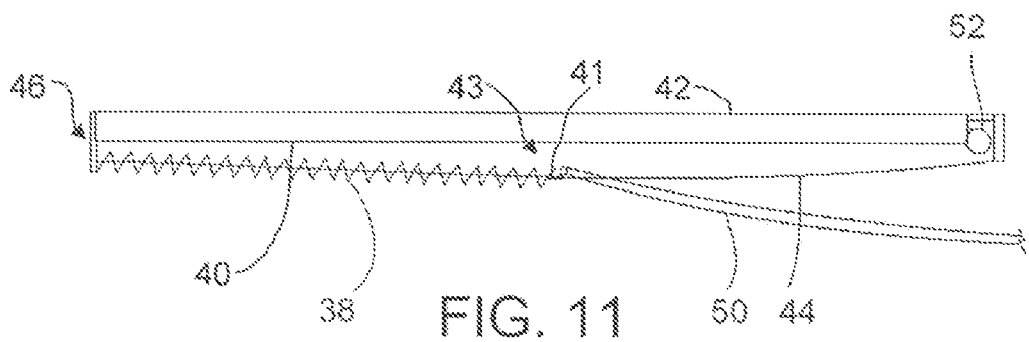
FIG. 11 is a side elevation view of the drip guard of FIG. 10 being extended using a draw cable.
Figure 12:
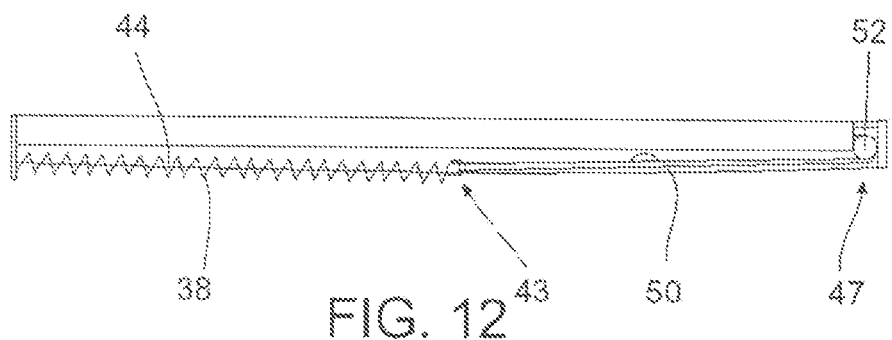
FIG. 12 is a side elevation view of the drip guard of FIG. 10 being extended using a winch.
Figure 13:
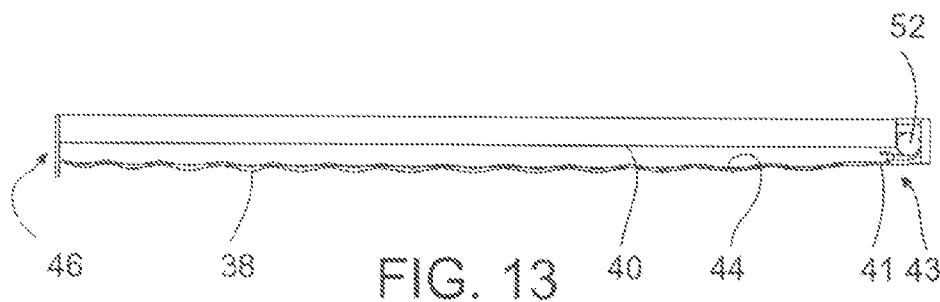
FIG. 13 is a side elevation view of the drip guard of FIG. 12 in the fully extended position.
Figure 16:
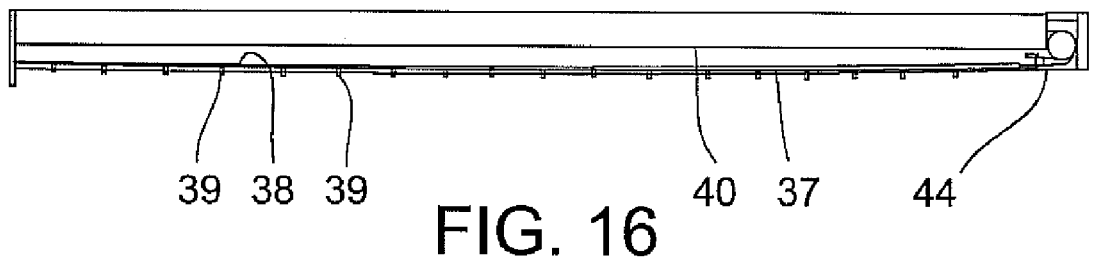
FIG. 16 is a side elevation view of a drip guard attached to cables using rungs in the fully extend position.

Referring to FIG. 10, a drip guard 100 for machinery is shown consisting of a sheet 38 attached to an undercarriage 40 of a piece of machinery 42. Sheet 38 may be made from a liquid impervious material, preferably being a material that is impervious to water and oil-based materials commonly known in the art. Piece of machinery 42 may be a vehicle (not shown), trailer, or any other type of equipment that may leak or spill materials. Sheet 38 is shown bunched up in an accordion-like fashion while in the retracted position. Sheet 38 has a hook 41 attached to an extending end 43 of sheet 38. There may be provided more than one of hook 41. Sheet 38 may be provided with drainage valves (not shown). In this example, sheet 38 is attached to cables 44 that run the length of undercarriage 40. Alternatively, drip guard 100 may be provided without cables 44. In the example shown in FIGS. 10-14, cables 44 are attached through numerous holes (not shown) in sheet 38, running along the length of sheet 38. This method of securing sheet 38 to cables 44 is similar to that seen with conventional window blinds. The holes that cables 44 pass through should be designed to prevent liquid form passing through, while still allowing cables 44 to glide though. Referring to FIG. 16, cables 44 are secured to an underside 37 of sheet 38 using numerous rungs 39. Alternatively, cables 44 may be secured to the top of sheet 38. Referring to FIG. 13, sheet 38 is movable along cables 44. In this way, cables 44 guide sheet 38 between the extended position (shown in FIG. 13) and the retracted position (shown in FIG. 10). Referring to FIG. 10, sheet 38 is secured to a first end 46 of undercarriage 40 by securing hook 41 with an attachment line 48. Attachment line 48 is secured to first end 46 of undercarriage 40. By securing sheet 38 to first end 46 when retracted, this prevents sheet 38 from moving around on cables 44 when machinery 42 is in motion. Alternatively, extending end 43 of sheet 38 may be secured to anywhere on undercarriage 40. Referring to FIG. 11, sheet 38 is being drawn using a draw cable 50. Draw cable 50 may extend sheet 38 by hand (shown in FIG. 11) or by a winch 52 (shown in FIG. 12). Referring to FIG. 13, in order to fully extend sheet 38, winch 52 is used to pull sheet 38 taut. Winch 52 should be provided with a locking mechanism (not shown) in order to maintain tension in sheet 38. Alternatively, hook 41 may be secured to an attaching mechanism (not shown) by hand, in a manner similar to that shown for sheet 14 in FIG. 7.

Figure 14:
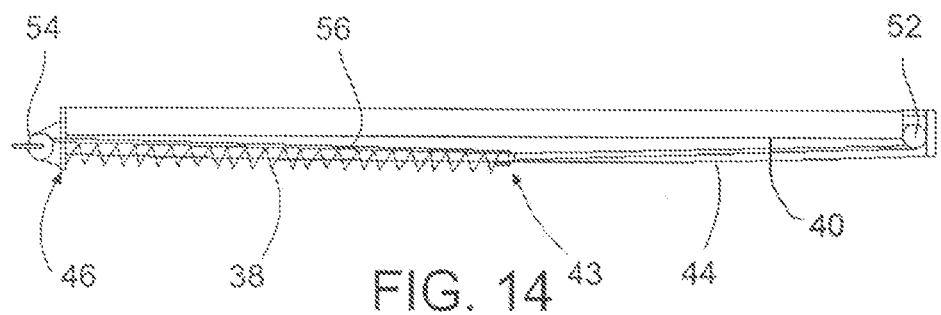
FIG. 14 is a side elevation view of the drip guard of FIG. 13 being retracted using a hand roller.

Referring to FIG. 14, sheet 38 may be retracted by using a cranking mechanism 54. In the example shown in FIG. 14, cranking mechanism 54 consists of a draw line 56. Draw line 56 is connected to extending end 43 of sheet 38. When cranking mechanism 54 is cranked by hand or machine, sheet 38 is retracted into the fully retracted position (shown in FIG. 10).

Figure 15:
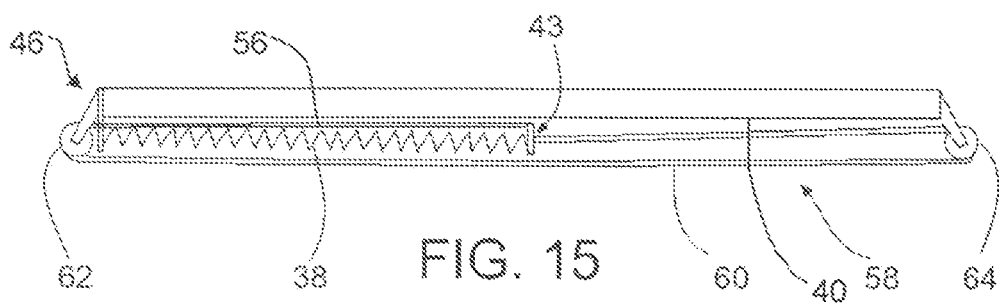
FIG. 15 is a side elevation view of a drip guard that is retracted and extended using a clothesline pulley system.

Referring to FIG. 15, sheet 38 may be retracted and extended by a clothesline cable system 58. Clothesline cable system 58 consists of a continuous cable 60, a first pulley 62 and a second pulley 64. Continuous cable 60 connects to both sides of extending end 43 of sheet 38 as shown. Alternatively, continuous cable 60 may connect to a rigid connection plate (not shown) positioned at extending end 43. When either of first or second pulleys 62 and 64, respectively are rotate continuous cable 60 extends or retracts sheet 38. Either of first or second pulleys 62 and 64, respectively, may be hand or motor driven. It should be understood flat sheet 38 may have cables 44 (shown in FIG. 10). Alternatively, continuous cable 60 may perform the same support and guidance functions as cables 44 in the above described embodiments, as well as extending/retracting sheet 38.

Referring to FIG. 2, sheet 14 is shown as it would be configured for the underside of a trailer 45. It should be understood that sheets 14 and 38 may be provided as any size or shape, such that it sufficiently covers undercarriage 18 (shown in FIG. 3) without obstructing wheels 32.

Operation:

Referring to FIG. 3, drip guard 10 is shown with sheet 14 in the retracted position. Generally, when sheet 14 is in the retracted position, extending end 27 is securely fastened to vehicle 12, in order to prevent sheet 14 from flapping around when vehicle 12 is in motion. In order to extend sheet 14, draw cable 16 is placed under undercarriage 18 and is attached to hook 25. Referring to FIGS. 4 and 5, draw cable 16 pulls extending end 27 of sheet until sheet 14 is fully extended. Referring to FIG. 5, extending end 27, when fully extended, is secured to second end 22 of undercarriage 18. This may be accomplished by securing hook (or hooks) 25 to loop (or loops) 31. Once extending end 27 is securely fastened to second end 22, crank 28 is used to rotate roller assembly 26 in order to pull sheet 14 tight between first and second ends 20 and 22, respectively. The tension introduced into sheet 14 is shown pulling sheet 14 up taut against spare tire 29. In order to retract sheet 14, roller assembly 26 is rotated to put enough slack into sheet 14 such that hook 25 may be removed from loop 31, thereby unfastening extending end 27 from second end 22. Referring to FIG. 4, once extending end 27 is free, roller assembly 26 may be cranked to roll up sheet 14, until sheet 14 is fully retracted.

Referring to FIG. 6, the same procedure for retracting and extending sheet 14 may be used as described above, with the exception that sheet 14 is supported by cables 36. Cables 36 prevent sheet 14 from dragging on the ground when being retracted or extended. This prevents any damage from being incurred by sheet 14, either from rocks or sharp objects, or from dirt or mud contaminating roller assembly 26.

Referring to FIG. 8, draw cable 16 is attached to winch 33. In this way, winch 33 can provide the pulling force responsible for extending sheet 14 in the above procedures. Once winch 33 has pulled sheet 14 taut, winch 33 is locked. In order to retract sheet 14, winch 33 is unlocked and roller assembly 26 is cranked to retract sheet 14.

Referring to FIG. 10, drip guard 100 is shown with sheet 38 initially stored in the fully retracted position with hook 41 secured to first end 46 of undercarriage 40 using attachment line 48. Attachment line 48 is first disconnected from hook 41, and hook 41 is then connected to draw cable 50 (shown in FIG. 11). Draw cable 50 may be used to tightly extend and secure sheet 38 to second end 47 of undercarriage 40 in a manner similar to that shown and described for FIG. 5 above. Referring to FIG. 12, draw cable 50 may be secured to winch 52. Winch 52 is used to pull extending end 43 all the way to second end 47 of sheet 38. Winch 52 is then used to pull sheet 38 tight and lock it in place in a manner similar to that shown and described for sheet 14 described in FIG. 8 above. Referring to the example shown in FIG. 13, in order to retract sheet 38, a retracting cable (not shown) may be positioned underneath undercarriage 40 from first end 46 such that it reaches all the way to extending end 43 of sheet 38. The retracting cable may be connected to hook 41, and it may be pulled from first end 46 such that extending end 43 is guided along cables 44 towards the retracted position. Referring to FIG. 10, once sheet 38 is in the retracted position, attachment line 48 is attached to hook 41, securing sheet 38 in place. Referring to FIG. 14, sheet 38 may be alternatively retracted by unlocking winch 52, and rotating cranking mechanism 54 such that draw line 56 pulls extending end 43 of sheet 38 towards first end 46. Once retracted, sheet 38 may be scoured as described above for FIG. 10.

Referring to FIG. 15, clothesline cable system 59 allows sheet 38 to be easily retracted and extended. When either of first or second pulleys 62 and 64, respectively, is rotated clockwise, continuous cable 60 extends sheet 38. When either of first or second pulleys 62 and 64, respectively, is rotated clockwise, continuous cable 60 retracts 60 retracts sheet 38. Either or both of first or second pulleys 62 and 64, respectively, can be attached to a mechanical motor (not shown), or a hand crank system (not shown). In order to secure sheet 38 in the retracted or extended position, either or both of pulleys 62 and 64, respectively, should be looked.

For any of the above described examples of drip guards 10 and 100, sheets 14 and 38, once extended, allow any spilled fluids or materials from vehicle 12 or piece of machinery 42 to be channeled into the lowest points of either of sheets 14 or 38. Referring to FIGS. 1 and 2, it is preferable to locate drainage ports 24 or drain valves (not shown) at these points. This way, when a leak or spill has occurred, a drain pan (not shown) may be positioned underneath of drainage ports 24 or drain valves, drainage ports 24 or drain valves may be opened, and the spilled materials can be removed. Alternatively, in the absence of drainage parts 24 or drain valve, sheets 14 and 38 can be manipulated while extended to pour out the spilled fluids into an appropriately located drain pan. An alternative to manipulating either of sheets 14 or 38 while extended would be to drive vehicle 12 or piece of machinery 42 to an appropriate location where sheets 14 and 38 may safely spill the collected contents while retracting sheet 14 or 48. An example of an appropriate location may be a large garage with a floor drain for hazardous liquids.

It should be understood that both of drip guards 10 and 100 may be provided as kits that are installed as permanent or temporary additions to any vehicle or piece of machinery. It should also be noted that drip guards 10 and 100 are both designed so that they may be used in the extended or retracted positions safely when the vehicle or piece of machinery is in motion or stationary.

Variations:

Either of vehicle 12 or piece of machinery 42 may be any piece of equipment that is susceptible to dripping or leaking fluids, where either of undercarriages 18 and 40 is the undercarriage of the piece of equipment.

Cautionary Warnings:

In this patent document the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope defined in the claims.

What is claimed is:

1. In combination:
   a piece of machinery having an undercarriage; and
   a drip guard comprising:
      at least one cable attached to a sheet of liquid impervious material and extending along the undercarriage of the piece of machinery;
      the sheet of liquid impervious material supported by the piece of machinery, the sheet of liquid impervious material having a retracted position and an extended position, in the retracted position the sheet of liquid impervious material being retracted toward a first end of the undercarriage, and in the extended position, the sheet of liquid impervious material being extended from the first end of the undercarriage toward a second end of the undercarriage and underlying a major portion of the undercarriage, the at least one cable facilitating deployment of the sheet of liquid impervious material from the retracted position to the extended position, and supporting the sheet of liquid impervious material in the extended position.

2. The combination of claim 1, wherein the drip guard further comprises multiple cables which support the sheet of liquid impervious material when the sheet of liquid impervious material in the extended position, underlies the major portion of the undercarriage.

3. The combination of claim 2, wherein the sheet of liquid impervious material is attached to the multiple cables such that the sheet of liquid impervious material is movable along the multiple cables.

4. The combination of claim 1, wherein the drip guard further comprises means for at least one of tightening, extending and retracting the sheet of liquid impervious material.

5. The combination of claim 4, wherein the means for extending and retracting the sheet of liquid impervious material comprises one of a draw line, a hand crank, a crank mechanism or by a winch.

6. The combination of claim 1, wherein the sheet of liquid impervious material further comprises extendable flaps that extend from the sheet of liquid impervious material to underlie additional portions of the undercarriage.

7. The combination of claim 1, wherein the sheet of liquid impervious material is rolled up in the retracted position.

8. The combination of claim 1, wherein the sheet of liquid impervious material is bunched in the retracted position.

9. The combination of claim 8, wherein the sheet of liquid impervious material is adapted to be bunched toward either of the first end and the second end of the undercarriage.

10. The combination of claim 1, wherein the sheet of liquid impervious material comprises drainage ports.

11. The combination of claim 1, wherein the machinery is a vehicle, and the undercarriage is the undercarriage of the vehicle.

12. The combination of claim 1, wherein the machinery is a piece of equipment that is susceptible to dripping or leaking fluids, and the undercarriage is the undercarriage of the piece of equipment.

\* \* \* \* \*